Feb. 13, 1934. J. A. GUYER 1,946,739
PROCESS OF TREATING HYDROCARBONS TO PRODUCE CARBON BLACK
Filed July 19, 1929
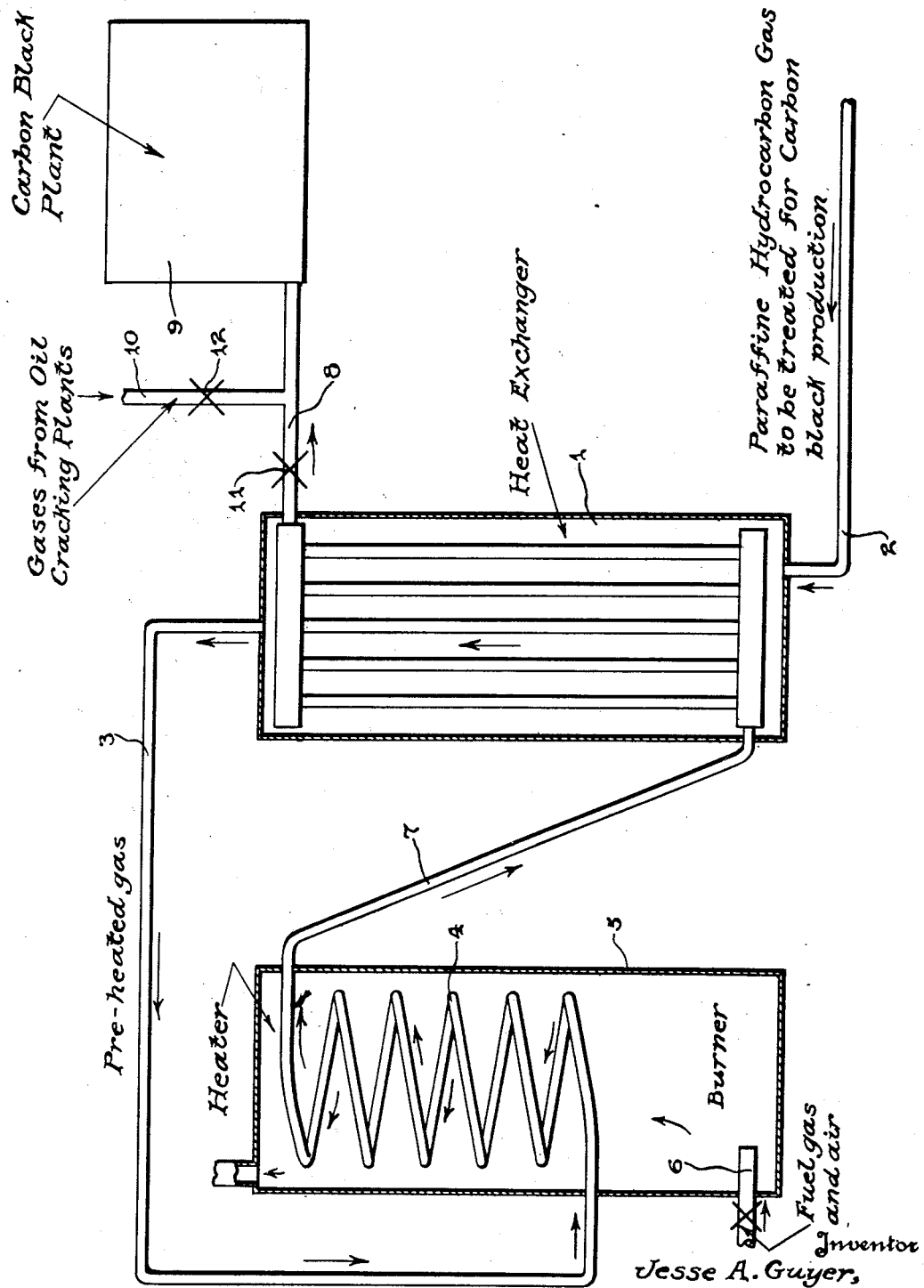
Inventor
Jesse A. Guyer,
By Robt. E. Barry
Attorney Patented Feb. 13, 1934

1,946,739

UNITED STATES PATENT OFFICE 1,946,739

PROCESS OF TREATING HYDROCARBONS TO PRODUCE CARBON BLACK

Jesse A. Guyer, Bartlesville, Okla., assignor to Phillips Petroleum Company, Bartlesville, Okla., a corporation of Delaware Application July 19, 1929. Serial No. 379,505

1 Claim. (Cl. 134—60)

This ivention relates to improvements in the production of carbon black, and more especially to the manufacture of carbon black from hydrocarbon gases which have been specially treated prior to the carbon black treatment to provide a gas containing a maximum amount of unsaturates or olefines.

In my process, a hydrocarbon gas which is to be burned for the production of carbon black is previously heat treated or partially cracked to produce large quantities of unsaturates. The gas may be cracked either in a tube furnace or in a reaction chamber where it is mixed with hot products of combustion. Conditions for partially cracking have been worked out which give the best yield and quality of carbon black.

The primary object of such a process is to crack the gas only to the point where polymerization starts, so that all the unsaturates are available for carbon black formation. So far as I am aware, the idea of cracking a hydrocarbon gas to various degrees, then controlling the flame conditions in the carbon black plant, seems to be novel in the manufacture of carbon black.

At the present time in the nautral gas gasoline industry, natural gas is first treated to remove raw natural gasoline, which in addition to the normal liquid constituents contains large amounts of normal hydrocarbon gases, such as butane, propane and ethane. This raw gasoline is fractionated by some suitable procedure, such as rectification, and in such treatment the pentane and heavier constituents are more or less sharply separated from the gaseous constituents, and I have found that these gaseous constituents, and especially substantially pure butane, are highly suited for the production of carbon black, providing such butane or the like is first subjected to a controlled heat treatment or partial cracking to produce large quantities of unsaturates. After the gas has been subjected to such a controlled heat treatment, it is processed in any suitable manner or subjected to partial combustion for the production of carbon black.

It is therefore another object of the invention to make carbon black from normal paraffin hydrocarbon gases which have been specially heat treated first for the production of a maximum amount of unsaturates.

I have also discovered that gases from oil cracking plants, either vapor phase or liquid phase, may also be used for the production of carbon black. Such gases may be used to enrich other gases for the production of carbon black. For example, I contemplate adding gases from oil cracking plants to partially cracked gases which have been obtained from the heat treatment of butane, propane, ethane or mixtures thereof, to produce large quantities of unsaturates; and this gaseous mixture is then treated for the production of carbon black.

With the foregoing objects outlined, and with other objects in view which will appear as the description proceeds, the invention consists in the novel features hereinafter described in detail, illustrated in the accompanying drawing, and more particularly pointed out in the appended claim.

The drawing shows a diagrammatic view of one form of a suitable apparatus which may be used in practicing my process.

Before proceeding with a detailed description of the operations, it may be stated that any suitable apparatus may be employed to place the fuel gas in condition for the production of carbon black. For example, the paraffin hydrocarbon gas or gases or the like, such as butane, propane, or mixtures thereof, accompanied by traces of pentane and ethane, may be heat treated in a tube furnace, an insulated reaction chamber or the like. The accompanying drawing shows one such apparatus.

This structure comprises a heat exchanger 1 in which the raw gas introduced through a pipe 2 is preheated by partially cracked gas, before flowing into a pipe 3. The latter communicates with a coil 4 arranged in a furnace 5 which may be heated by means of a suitable gas burner 6. The gas is passed through the coil 4 in such volume and at such velocity, while subjected to the heat from the burner 6, to produce a maximum amount of unsaturates and then this specially treated gas flows through a pipe 7 from which it is passed through the heat exchanger 1 and discharged by way of a pipe 8 which leads the same to a carbon black plant 9. In the latter the partially cracked gas containing large quantities of unsaturates may be converted into carbon black in any suitable way, but I prefer to subject the same to the partial combustion method now generally used for the production of carbon black.

Referring to the heat treatment in the coil 4, experiments have shown that at temperatures of 1250 to 1750° F. and at atmospheric pressure, the cracking of propane, butane, and mixtures of the two, proceeds endothermically with increase in volume and formation of simple gaseous olefines to a maximum of 35 to 50 percent by volume, by known reactions in which the paraffin molecule splits into two molecules, one an olefine and the other a simple paraffin or hydrogen. The heat absorbed by the reaction in the case of propane or butane is found to be about 700 B. t. u. per pound at 1562° F. cracking temperature, at which temperature the state of maximum olefine content coincides approximately with the state of maximum heat content. At this temperature this state is attained in somewhat less than 0.002 minutes. At the higher cracking temperatures within the range both the olefine content and heat content attain a somewhat higher maximum value than at the lower ones. The time consumed by this stage of reaction decreases rapidly with increase in the temperature at which it is conducted.

In endothermic cracking it happens that the reaction in the useful temperature range (1250–1750° F.) is so rapid that a practical coefficient of heat transfer through the confining surfaces as in the tube coil 4 develops a temperature at which the reaction will best absorb the heat furnished. Furthermore, in the early stages of endothermic cracking, the velocity of cracking is greater than in the later stages and a somewhat lower temperature is therefore developed than in the later stages of endothermic cracking. The time of cracking at a single temperature, moreover, is more or less incidental to the economically rapid introduction of endothermic heat. Experiments have shown that a tube coil operating at full capacity permitted the introduction of all the endothermic heat with an exit temperature in the gas of 1400–1425° F. An exit temperature above 1450° F. showed the instability characteristic of an incipient exothermic reaction. The value of 0.002 minutes at 1562° F. mentioned above, is a maximum value, and an exposure time for exothermically cracking ten times that long, 0.02 minutes, is a minimum value for developing a maximum amount of volatile aromatic oils from such gases, but the desideratum in the present invention is to place the gas in condition for the production of a fine quality of carbon black instead of the production of volatile oils.

In a modification of the invention I may use an unsaturated gas, such as produced by oil cracking processes. In such case gases from an oil cracking plant might be introduced into the line 8 through a pipe 10 and valves 11 and 12 could be used to control such introduction. Then instead of feeding partially cracked gases to the carbon black plant 9, the gases from oil cracking plants may be fed to the carbon black plant through the pipes 8 and 10.

As a further modification, the valves 11 and 12 might be set to mix with the partially cracked gas from the heat exchanger 1 with gases from an oil cracking plant, and such mixed gases would then be processed in the plant 9 for the production of carbon black.

While I have disclosed what I now consider certain preferred examples of my invention, it will be manifest to those skilled in the art that various changes may be made in the details of the procedure without departing from the spirit of the invention as expressed in the claim.

What I claim and desire to secure by Letters Patent is:

In a process for the production of carbon black, subjecting a normally gaseous paraffin hydrocarbon fluid of the type of butane, propane or mixtures thereof to a controlled partial cracking at a temperature within the range 1250–1750° F. and at substantially atmospheric pressure and for a period of time within the range extending from somewhat less than 0.002 minutes to 0.02 minutes, whereby about 35–50% of olefins are produced, and then subjecting the resultant unsaturates-rich gaseous admixture to a partial combustion treatment to produce carbon black.

JESSE A. GUYER.